United States Patent

Preuss

[11] 4,044,613
[45] Aug. 30, 1977

[54] DIRECT READING TEMPERATURE MEASURING BRIDGE CIRCUIT

[75] Inventor: Arnfried Preuss, Bordesholm, Germany

[73] Assignee: Howaldtswerke-Deutsche Werft Aktiengesellschaft Hamburg und Kiel, Kiel, Germany

[21] Appl. No.: 551,943

[22] Filed: Feb. 21, 1975

[30] Foreign Application Priority Data

Mar. 1, 1974 Germany .................................. 2409841

[51] Int. Cl.² .......................... G01K 7/20; G05F 3/00
[52] U.S. Cl. ............................ 73/362 AR; 323/75 L
[58] Field of Search ............... 73/362 AR; 323/75 H, 323/75 L

[56] References Cited

U.S. PATENT DOCUMENTS

| 2,659,234 | 11/1953 | Harrison | 73/362 AR |
|---|---|---|---|
| 2,777,326 | 1/1957 | Schwieg et al. | 73/362 AR |
| 3,225,297 | 12/1965 | Burley et al. | 323/75 L X |
| 3,230,772 | 1/1966 | Leslie et al. | 323/75 L X |
| 3,548,295 | 12/1970 | Borer | 323/75 L X |
| 3,613,454 | 10/1971 | McFadin | 73/362 AR |
| 3,688,581 | 9/1972 | LeQuernec | 73/362 AR |
| 3,742,764 | 7/1973 | Dauphinee | 73/362 AR |

Primary Examiner—Richard C. Queisser
Assistant Examiner—John S. Appleman
Attorney, Agent, or Firm—John C. Smith, Jr.

[57] ABSTRACT

An a.c.-fed temperature measuring bridge in the form of a balanced Wheatstone bridge containing a temperature sensor $R(\theta)$ which, depending upon the measured temperature $\theta$, generates an output voltage which is balanced by a variable voltage $y$ provided by ohmic ratio arms in such a way that if the sensor $R(\theta)$ has a non-linear characteristic, there will still be a linear relationship such that $\theta = $ const.$\cdot y$, the inventive feature being that the fixed ratio arms of the balanced Wheatstone bridge are formed by an inductive potential divider and that for correcting the non-linearity of the sensor the voltage across the variable ohmic ratio arms is a predetermined ratio ($O_3$) of the voltage feeding the bridge.

1 Claim, 2 Drawing Figures

DIRECT READING TEMPERATURE MEASURING BRIDGE CIRCUIT

BACKGROUND OF THE INVENTION

The invention relates to a direct reading temperature measuring bridge circuit containing a platinum resistance type sensor for the highly precise measurement of temperature variations, particularly of very small temperature variations.

In the case of temperature measuring bridges diverse circuit arrangements have been proposed which are usually based on the principle of the Wheatstone bridge. The temperature sensor, i.e. transducer, used for accurate measurements is a platinum resistance type sensor which has a non-linear temperature-resistance characteristic approximately represented by the relationship $R(x) = R_1(1 + \alpha X + \beta X^2)$, where $R(x)$ is the resistance of the sensor at $X°$ C, $R_1$ is the resistance at $0°$ C, and $\alpha$ and $\beta$ are constants. The non-linearity of the sensor is an unfavorable property which must be compensated for in the measuring device. The measuring device must further be capable of being calibrated simply in such a way that when it is in a state of balance the increment of a predetermined balancing resistor corresponds to the actual temperature change in the environment of the sensor.

SUMMARY OF THE INVENTION

According to the invention this is achieved by the employment of a balanced Wheatstone bridge containing a temperature sensor $R(x)$ which, depending upon the measured temperature, generates an output voltage which is balanced by a variable voltage $y$ provided by ohmic ratio arms in such a way that also if the sensor $R(x)$ has a non-linear characteristic, there will still be a linear relationship such that $X = \text{const.} \cdot y$, the inventive feature being that the fixed ratio arms of the balanced Wheatstone bridge are formed in a manner known per se by an inductive potential divider and that for correcting the non-linearity of the sensor the voltage across the variable ohmic ratio arms is a predetermined ratio ($0_3$) of the voltage feeding the bridge.

The manner in which a bridge according to the invention functions will now be described with reference to FIGS. 1 and 2 of the drawings, in which.

Figure 1:
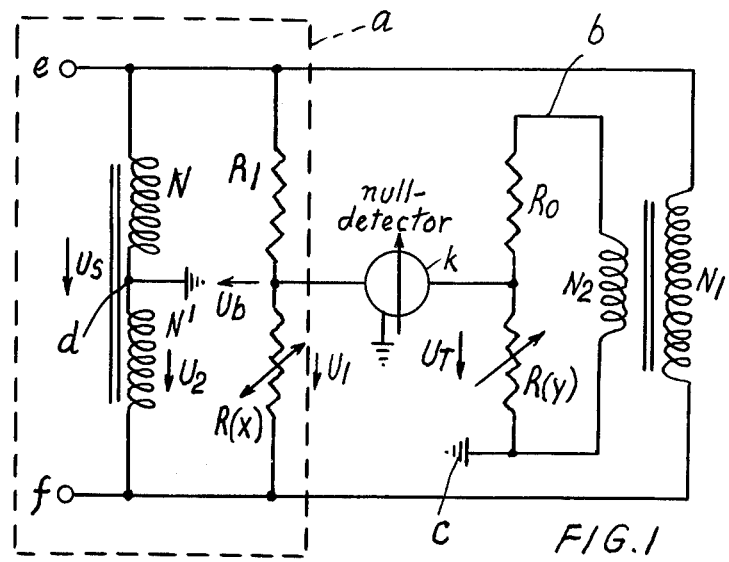
FIG. 1 is a schematic diagram of the network.

The first part of the network (FIG. 1) contains a Wheatstone bridge $a$ comprising an inductive potential divider with two windings N and N' and an ohmic potential divider with the resistance $R_1$ and a variable resistor $R(x)$ which depends on the input variable $x$ (temperature). This Wheatstone bridge $a$ is supplied at connections $e$ and $f$ with the voltage $u_s$ and produces the output voltage $u_b$ as the difference between voltages $u_2$ and $u_1$. The bridge is grounded at $d$.

The second part of the network (FIG. 1) is a further potential divider $b$ with the resistor $R_O$ and a variable resistor $R(y)$ provided with a scale with the subdivision $y$. The potential divider $b$ is fed by the secondary winding $N_2$ of a transformer, the primary winding $N_1$ of which is connected to the supply voltage $u_s$. The output voltage $u_T$ compensates the output voltage $u_b$ of the bridge $a$. Indication is accomplished by means of a zero detector $k$. The foot of the potential divider $b$ is grounded at $c$. It can be shown that the output voltage of a Wheatstone bridge $a$ containing a resistance $R(x) = R_1 + x \Delta R_x$ which varies in proportion to a variable quantity $x$ can be balanced by a potential divider $b$ containing a resistance $R_y \cdot \Delta R_y$ which varies in proportion to a quantity $y$ in such a way that $x = \text{const.} \cdot y$. In the network illustrated in FIG. 1 the following equation holds for the output voltage $u_b$ of the Wheatstone bridge $$u_b = u_1 - u_2 = u_S\left(\frac{R_1 + x\Delta R_x}{2R_1 + x\Delta R_x} - \frac{1}{2}\right) = \frac{u_S}{2} \cdot \frac{x\Delta R_x}{2R_1 + x\Delta R_x}$$

whereas the voltage $u_T$ at voltage divider $b$ is defined by $$u_T = \frac{N_2}{N_1} u_S \cdot \frac{y\Delta R_y}{R_O + y\Delta R_y}$$

If in this instance $N_2/N_1 \cdot u_S = u_S/2$ is set, then the condition of balance will be simplified to $$\frac{x\Delta R_x}{2R_1 + x\Delta R_x} = \frac{y\Delta R_y}{R_O + y\Delta R_y} \text{ or}$$

$$x\Delta R_x R_O + x\Delta R_x \cdot y\Delta R_y = y\Delta R_y \cdot 2R_1 + x\Delta R_x \cdot y\Delta R_y$$
$$x\Delta R_x R_O = y\Delta R_y \cdot 2R_1 \text{ or}$$

$$x = y \cdot \frac{\Delta R_y 2R_1}{\Delta R_x \cdot R_O} = \text{const.} \cdot y$$

The relationship between the input variable $x$ and the balancing quantity $y$ is therefore linear. It is also worthy of note that the increments $\Delta R_y$ of the balancing resistor $R(y)$ can be freely chosen although the choice of the resistor ($R_x$) (temperature sensor) determines the magnitude of the increment $\Delta R_x$ and of $R_1$. The balancing potential divider $b$ can therefore conveniently be composed of resistors which can be cheaply manufactured to comply with the necessary tolerances. Another major advantage is that when the properties of ($\Delta R_x + R_1$) of the resistor $R(x)$ are fixed and the scale $\Delta R_y$ of the resistor is likewise fixed, the const. in the equality $x = \text{const} \cdot y$ can still be varied by adjustment of $R_O$ in the potential divider $b$. This permits the arrangement to be easily adapted to resistors $R(x)$ having different properties. It should also be emphasised that the position of the measuring range is determined exclusively by $R_1$, whereas the potential divider $b$ merely determines the width of the range. Particularly when this is small it need not therefore satisfy the same stability requirements as the resistor $R_1$.

If the bridge is so modified that for a ratio of the bridge divider of 1:2 the transformation ratio $N_2/N_1 \neq 0.5$ is chosen then the conditions of balance will be $$x = \frac{y \cdot \frac{N_2}{N_1} \Delta R_y \cdot 4R_1}{\Delta R_x \cdot R_o + \Delta R_x \cdot \Delta R_y (1 - \frac{N_2}{N_1}) \cdot y}$$

It will be seen that the second term in the denominator does not vanish and depends on $y$; in other words, the relationship between the input variable $x$ and the balancing quantity $y$ is not then linear. This circumstance is utilised to compensate any non-linearity of the sensor, as represented by the equation $R(x) = 1 + \alpha x + \beta x^2$) for a platinum resistance sensor.

Figure 2:
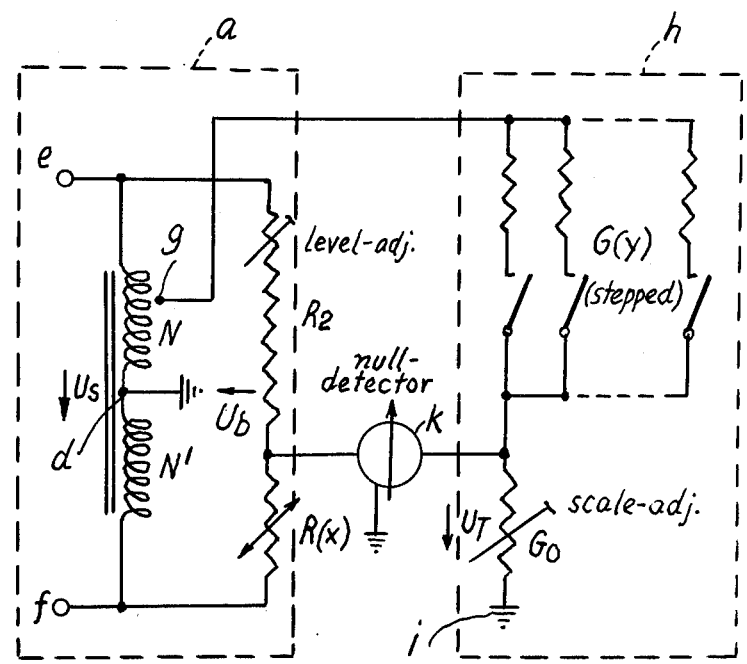
FIG. 2 is a schematic diagram of an exemplary embodiment of the network.

FIG. 2 shows a Wheatstone bridge $a$ with the two windings N and N', the temperature-dependent resistor $R(x) = R_1 (1 + \alpha x = \beta x^2)$ and the reference resistor $R_2$ adjustable within a small range. The bridge $a$ is grounded at $d$ and is supplied at connections $e$ and $f$ with the voltage $u_S$. The winding N has a divider $g$. The bridge $a$ is balanced for a reference point, e.g. 0° C.

Furthermore, FIG. 2 shows a potential divider $h$ with a step resistor having the conductivity $G(y) = \Delta Gy \cdot y$ and an adjustable resistor with the conductivity $G_0$. The potential divider $h$ is grounded at $i$ and generates the voltage $u_T$, when it is supplied via the divider $g$ of winding N. The output voltage $u_b$ is compensated with the voltage $u_T$ by adjustment of resistor $G(y)$. Indication of compensation is accomplished by means of zero detector $k$.

The invention may be embodied in other specific forms without departing from the spirit or essential characteristics thereof. The embodiment described and shown is therefore to be considered in all respects as illustrative and not restrictive.

What is claimed is:

1. A temperature measuring circuit comprising in combination:
 a. an electrical bridge comprising;
  1. a temperature responsive resistor and a reference resistor in two of its branches respectively;
  2. first and second windings of a transformer in the other two of its branches respectively;
 b. means for supplying a voltage input across the junction points between said resistors and said transfer windings;
 c. a null detector;
 d. means for connecting said null detector to the output of said bridge taken between the junction of said transformer windings and a common connecting point between said temperature responsive and reference resistors;
 e. a voltage divider comprising a fixed resistor and a variable resistor;
 f. means for supplying a portion of said voltage input across said fixed and said variable resistors;
 g. means for connecting said null detector to a junction between said fixed and variable resistors whereby said variable resistor may be adjusted so as to supply voltage to said null detector until the voltage from said bridge has been nullified; and
 h. a linear graduation scale associated with said variable resistor having a predetermined temperature indicating scale;
 i. the ratio of the supply voltage for said potential divider to the supply voltage of said bridge being such that when balanced there is a linear relationship between the actual temperature change sensed by said temperature responsive resistor and the incremental change of the value of said variable resistor necessary to nullify the voltage from said bridge as determined by said null detector.

* * * * *